US 6,750,991 B2

(12) United States Patent
Cardot et al.

(10) Patent No.: US 6,750,991 B2
(45) Date of Patent: Jun. 15, 2004

(54) DYNAMIC DOCUMENT FEEDER SYSTEM AND METHOD FOR MAXIMIZING SCANNING THROUGHPUT

(75) Inventors: Timothy R. Cardot, Henrietta, NY (US); Thomas W. Ebert, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 628 days.

(21) Appl. No.: 09/822,099

(22) Filed: Mar. 30, 2001

(65) Prior Publication Data

US 2002/0140995 A1 Oct. 3, 2002

(51) Int. Cl.[7] ............................. H04N 1/04; H04N 1/40; H04N 1/00; H04N 1/36; H04N 1/32; B65H 5/34
(52) U.S. Cl. ..................... 358/497; 358/404; 358/412; 358/444; 358/496; 358/442; 358/497; 358/475; 358/474; 271/270
(58) Field of Search ................. 358/404, 412, 358/444, 496, 442, 497, 475, 474; 271/270

(56) References Cited

U.S. PATENT DOCUMENTS 4,748,514 A * 5/1988 Bell ........................ 358/486
5,517,331 A * 5/1996 Murai et al. ............. 358/486
5,921,539 A   7/1999 Westcott et al.
6,160,636 A * 12/2000 Nagano et al. ........... 358/412

* cited by examiner

Primary Examiner—Edward Coles
Assistant Examiner—Houshang Safaipour
(74) Attorney, Agent, or Firm—Nixon Peabody LLP

(57) ABSTRACT

A control system and method for an optical scanner of the type having a document feeding device for transporting documents to an optical scanning station is provided. The control system includes a plurality of buffer memories for temporarily storing optical data from documents processed through the scanning station, and a control circuit connected to the buffer memories and the document feeding device. The delivery rate of the document-feeding device is maximized to a level consistent with an estimated mode value of optical data present on the documents being scanned. When documents having higher than normal optical data cause the buffer memories to fill up faster then than they empty, the control circuit transmits a command to pause or slow down the delivery rate of the document feeding device upon a determination that a threshold capacity of any of the buffer memories has been exceeded or is about to be exceeded. By maximizing the delivery speed of the document-feeding device in accordance with the actual amount of optical data on the documents being scanned, throughput for a given processing bandwidth is maximized.

23 Claims, 3 Drawing Sheets

DYNAMIC DOCUMENT FEEDER SYSTEM AND METHOD FOR MAXIMIZING SCANNING THROUGHPUT

FIELD OF THE INVENTION

This invention generally concerns control systems for document feeders, and is specifically concerned with a system and method for dynamically controlling the rate that a document feeder delivers documents to the scanning station of an optical scanner such that throughput for a given processing bandwidth is maximized.

BACKGROUND OF THE INVENTION

Optical scanners for scanning and recording optical data present on documents are well known in the prior art. Such optical scanners typically include a scanning station having an optical reading element, a light source, and a platen formed from glass or transparent plastic for maintaining a document in a flat position as it is moved across the line-of-sight of the optical element by an assembly of belts and rollers. In some scanners, the documents stay stationary in the platen while the optical reading element is moved. Either type of scanner includes a document feeder for regularly feeding a train of documents into the document-conveying rollers and belts of the station. In operation, optical data from the documents is transmitted from the optical reading element to one or several buffer memories, which temporarily stores the data for further processing, typically includes the compression of the data and permanent storage thereof onto a magnetic disk.

Because such scanners are often used to make permanent records of important documents, it is important that they operate in such a manner that no data is lost. Such data loss could occur if the capacity of any one of the buffer memories were overloaded as the document was transported past the scanning element. To avoid such a scenario, the speed of the document feeders is deliberately limited to a speed in which the documents containing the highest density of optical information could be delivered to the scanning station and read thereby without overloading the available buffer memory capacities. Unfortunately, in limiting the transport speed to such "worst case" scenario documents, the inventors have observed that the scanner operates at a speed which is slower than necessary for most of the documents contained within a particular scanning run or batch.

Clearly, there is a need for a control system for an optical scanner that does not limit the delivery speed of the document feeder to those documents having the highest density of optical data. Ideally, such a system would operate the document feeder at the fastest rate consistent with the amount of optical data present on a typical document contained within a scanning run, and would automatically pause or slow down the feeder when documents having a higher than normal density of optical data were read by the scanning station without the need for operator intervention. Finally, such a system should be simple and inexpensive to construct and install, easily retrofittable on existing scanners, and should operate reliably without loss of optical data.

SUMMARY OF THE INVENTION

Generally speaking, the invention is both a control system and method for an optical scanner of the type having a mechanism for feeding documents to a scanning station that overcomes the throughput limitations associated with prior art scanners and meets the aforementioned needs in the art. To this end, the control system of the invention comprises a plurality of buffer memories for temporarily storing optical data from documents processed through the scanning station, and a control circuit connected to the buffer memories and the document feeding mechanism for transmitting a command to change a delivery rate of the document feeding mechanism upon a determination that a threshold capacity of any of the buffer memories has been exceeded or is about to be exceeded.

The control system may include a buffer monitor circuit for determining whether any one of the plurality of buffer memories becomes filled to the threshold capacity, which may be indicative of an "almost full" state of each of the buffer memories. This "almost full" threshold capacity may be pre-selected, and the command to change the delivery rate of the document feeding mechanism may be a pause command. A second threshold capacity may also be pre-selected for each of the buffer memories which is less than the "almost full" threshold for each and which indicates that the particular buffer memory is "sufficiently empty" to receive additional optical data. The buffer monitor circuit may generate a first set of signals indicative of whether the "almost full" threshold of any of the buffer memories has been exceeded, as well as second set of signals indicative of whether or not the capacity of the buffer memories is below the "sufficiently empty" threshold. The first and second signals may be transmitted to first and second gate circuits, and the first gate circuit may generate a pause command upon receipt of a signal that any of the buffer memories is above the "almost full" threshold, while the second gate circuit may cancel the pause command upon receipt of signals from each of the buffer memories that all (or selected) of the memories are below the "sufficiently empty" threshold.

The capacity of each of the buffer memories may also be pre-selected by electronically changing the portioning between the various memories. In other words, one buffer memory may be expanded in capacity at the expense of another prior to running a particular batch of documents. This feature is particularly useful in efficiently allocating buffer memory resources when, for example, there is typically less information on the back side of the document than the front sides, or only grayscale images are needed rather than color images.

In an alternate embodiment of the system, the buffer monitor circuit and gate memories may be replaced with a processor which simultaneously monitors the remaining capacity of each of the buffer memories, as well as the trends associated with the density of optical data contained in the documents being scanned, and individually determines, on a floating basis, both an "almost full" threshold and a "sufficiently empty" threshold for each of the buffer memories. In such an alternate embodiment, the implementation of the changing of the delivery rate of the document feeding mechanism is not limited to the generation and cancellation of a pause command, but also includes a speeding up or slowing down of the delivery rate which is dependent upon (at least in part) extrapolated trends in the density of optical data in the documents being processed by the scanning station.

In both embodiments of the system, document throughput is substantially increased by adjusting the delivery rate of the sheet feeder to a maximum rate consistent with the density of the optical data on the documents actually being scanned.

BRIEF DESCRIPTION OF THE DRAWINGS

FIG. 1 is a schematic side view of a document scanner that the control system and method is particularly adapted for use with;

DETAILED DESCRIPTION OF THE INVENTION

Figure 1:
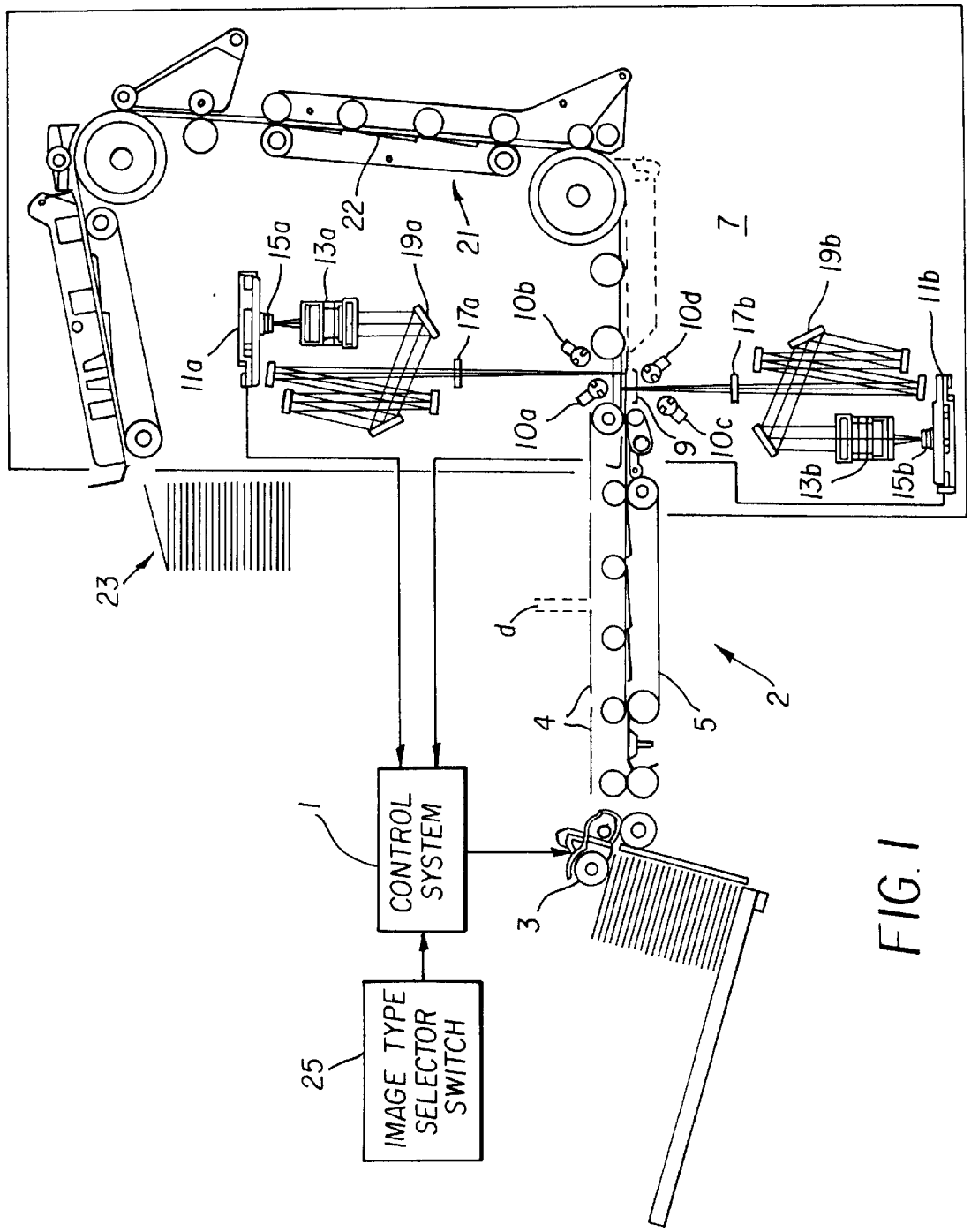

With reference now to FIG. 1, the control system 1 of the invention is particularly adapted for use in a document scanner 2 of the type having a document feeder 3 for transporting documents 4 via a conveyor 5 into a scanning station 7. The document feeder 3 may be, for example, the type of feeder disclosed and claimed in U.S. Pat. No. 5,921,439, and assigned to Eastman Kodak Company of Rochester, N.Y. Such feeders include a clutch mechanism (not shown) capable of feeding input documents 4 onto the conveyor 5 at a variable rate. Because the conveyor 5 transports the documents 4 at the same speed throughout the scanning process, the effect of such a variable feeder rate is to vary the distance "d" between the side edges of the input documents 4. Even though the speed of the conveyor 5 remains constant, a large distance "d" between the documents 4 reduces the processing load on the document scanner 2, while a small distance "d" increases it.

The scanning station 7 includes a platen 9 for receiving the input documents 4 and maintaining them in a flat orientation as they are illuminated by the light sources 10a–d and scanned by the cameras 11a, b. Light sources 10a, b illuminate the front surface of the document scanned by camera 11a, while light sources 10c, d illuminate the backside of the document scanned by camera 11b. Each of the cameras 11a, b includes an imaging sensor assembly 15 having at least one charge coupled device (CCD) image sensor. Preferably the image sensor has between 100 to 1200 pixels per inch (relation to the document) so that each of the cameras 11a, b is capable of producing high-resolution images of the documents that cross their line-of-sight through the platen 9. Each of the cameras 11a, b further includes a directing lens 17a, b and a mirror array 19a, b for directing reflected light from the front and back sides of the document being scanned into the lenses 13a, b of the cameras.

The scanning station 7 further has an internal document transporter 21 formed from an array of belts and rollers for receiving documents from the feeder conveyor 5 and transporting them across the line-of-sight of the cameras 11a, b. The speed of the internal document transporter 21 is coordinated with the cameras 11a, b and the feeder conveyor 5, and is set at a value that allows the cameras 11a, b to capture an image of the documents conveyed through the platen 9 at the resolution level of the imaging sensor assembly 15. The internal document transporter 21 transports scanned documents around the upper camera 11a and stacks the documents 23 as shown.

As is schematically illustrated, a selector switch 25 is connected to the control system 1 for allowing the operator of the document scanner 2 to choose the resolution and type of images generated of the documents fed into the scanning station 7. For example, the operator may choose either high or low resolution in combination with either color, grayscale, or bi-tonal image types. The selector switch also allows the operator to indicate the size of the documents being scanned, i.e., check-size, 8½×11 inches, etch. As previously indicated, the choices made via the selector switch automatically adjusts the feed rate of the feeder 3, which in turn determines the distance "d" between incoming documents 4 going to the scanning station 7.

Figure 2:
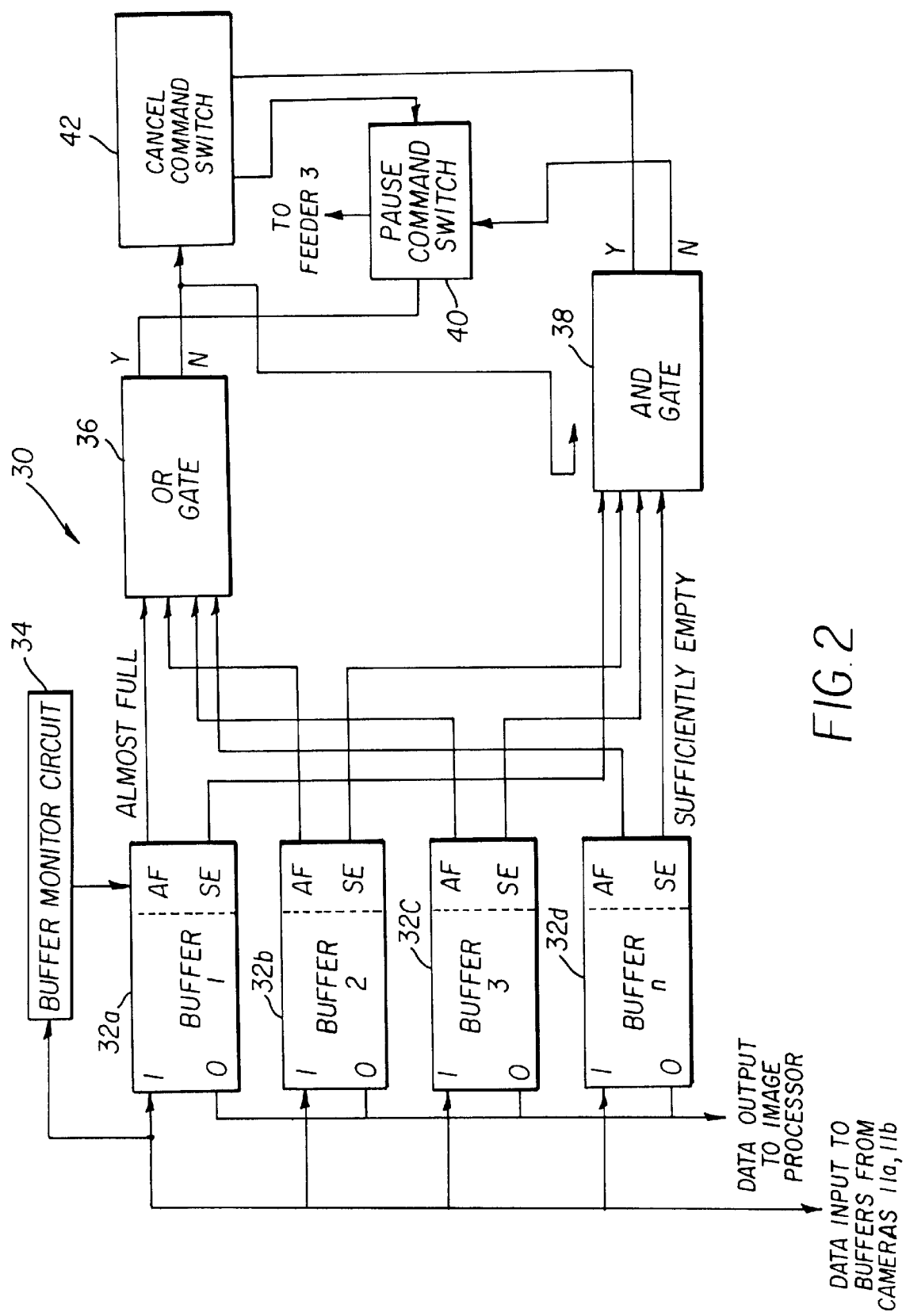
FIG. 2 is a schematic diagram of a first embodiment of the control system.

FIG. 2 illustrates a first, relatively simple embodiment 30 of the system of the invention. In this embodiment, four buffer memories 32a–d are provided, although more may be provided if desired. While each of the buffer memories 32a–d is shown as an independent component, they are preferably all part of a single memory circuit to facilitate repartitioning for reallocation purposes. In the preferred embodiment, each of the buffers 32a–d temporarily stores one of the parameters of the document image, i.e., grayscale information, bi-tonal information, color data, and image data for the front and back sides of the document, respectively. Each of the buffer memories 32a–d has substantially the same storage capacity which may be, for example, 128 megabytes.

The control system 30 further includes a buffer monitor circuit 34 for monitoring the amount of data actually present in each of the buffers 32a–d at any given moment in time, and comparing this amount of data with a first threshold capacity for each of the buffers 32a–d, which is referred to in FIG. 2 as the "almost full" capacity. To this end, the buffer monitor circuit 34 monitors the addresses assigned to each of the data bytes that are transmitted into the buffers 32a–d, and compares these addresses with the addresses that correspond to an "almost full" condition in any of the buffers. It should be noted that the "almost full" value selected for each of the buffers 32a–d does not correspond to the maximum capacity of the buffers; typically, this value will amount to between 70% and 80% of the maximum capacity of each of the buffer memories 32a–d so as to leave a reserve capacity of between 20% and 30% in the event that the "almost full" is ever tripped. The reason for selecting the "almost full" value so that such a reserve capacity is left is that, even after a pause command is transmitted to the document feeder 3, there will typically be some documents either being scanned or "in the pipeline" to be scanned, i.e., in the feeder conveyor 5 and internal document transporter 21 on their way to the cameras 11a, b. The 20% to 30% reserve capacity in each of the buffers 32a–d insures that no data will be lost after the control system 1 generates a pause command as there is sufficient capacity left to scan and process all such "pipeline" documents. It should be noted that the "almost full" threshold could be as little as 30% when high resolution color images are being generated of large documents. Conversely, this threshold could be as high as 95% low when resolution bi-tonal images are being made of small documents.

In addition to assigning an "almost full" value to each of the buffers 32a–d, the buffer monitor circuit 34 further assigns a second threshold value to each of these buffers which is designated as a "sufficiently empty" level in the drawing. The "sufficiently empty" level is always lower than the "almost full" level, and may be, for example, 50% or 55% of the maximum capacity of each of the buffers. As will be described in more detail hereinafter, the assignment of a "sufficiently empty" level or value to each of the buffer memories 32a–d does not allow the pause command to be canceled until the buffer memories have emptied their contents to a level which allow a relatively smooth resumption of the operation of the document feeder 3. Stated in more technical terms, the provision of a "sufficiently empty" threshold provides the system 1 with a measure of hysteresis that avoids overly frequent transmission of a pause command from the system 1. The buffer monitor circuit 34 may be any one of a number of relatively inexpensive and low bandwidth capacity programmable processors, such as a Model No. MPC 823, manufactured by Motorola, located in Schaumburg, Ill., in combination with an Altera 203100 FPGA.

The system 30 further includes an OR gate 36 and an AND gate 38. The gates 36, 38 may be part of the previously referred to FPGA or anyone of a number of commercially available logic gates. As is schematically illustrated, the output of the buffer monitor circuit 34 is connected to the input of each of the OR and AND gates 36, 38, and generates a signal for each of the buffer memories 32a–d whether the first or second thresholds have been exceeded. Finally, the system 30 includes a pause command circuit 40, and a cancel command circuit 42 connected to the outputs of the OR and AND gates 36, 38. The circuits 40 and 42 may be either standard logic circuits or switching circuits; the particular component used does not form per se, the invention.

In operation, the feed rate of the document feeder 3 is initially preprogrammed into the system 30 on the basis of an empirically determined amount of optical data corresponding to the "average" amount of data on a typical document in a typical scanning batch. In operation, the system operator selects, via switch 25, the type and resolution of document images desired, and indicates the size of the documents in the batch. The image processor will then select the document feeder 3 and the threshold levels (as well as the buffer memory positioning) so that the average amount of optical data on a typical document will consistently fall close to the "almost full" capacity of each of the buffers 32a–d. This way, the throughput of the document scanner 2 is maximized with respect to documents of the most common data density and the available processing bandwidth of the buffer memories 32a–d.

During the processing of such average density documents, the "almost full" threshold will not be exceeded, although the "sufficiently empty" threshold may be. Thus the AND gate transmits a signal along its "no" branch to the pause command switch 40 in an attempt to actuate it. However, at the same time, the OR gate transmits a signal along its "no" branch to the "cancel command" switch, which actuates it and causes it to prevent actuation of the pause command switch 40. When one or more documents having a significantly greater than average amount of optical information is processed through the scanning station 7 such that any of the buffer memories 32a–d reaches the threshold corresponding to the "almost full" value, the "yes" branch of the OR gate 30 transmits an electrical signal which again instructs the pause command circuit 40 to actuate. At the same time, the signal to the cancel command switch 42 from the OR gate ceases, thus deactivating the switch 42. The circuit 40 is then free to transmit a pause command to the document feeder 3, which ceases to feed documents onto the document conveyor 5. However, image data continues to flow to the buffers 32a–d as the document scanner 2 completes the scanning operation of all documents either in the platen 9, or in route to the platen via the document conveyor 5. The reserve capacity of the buffers 32a–d allows all of the information on such "in process" documents to be scanned without any loss of data. Eventually, the scanning of the "in process" document is completed, and the image data in the buffers 32a–d decreases as the data contained therein is downloaded to an imaging processor (not shown), past the "almost full" threshold, whereupon the OR gate 36 ceases to provide a signal along its "yes" branch to the pause command switch 40. However, the cancel command switch 42 is not actuated to countermand the pause command switch 40 until the amount of data stored in all of the buffers 32a–d falls to the "sufficiently empty" threshold, whereupon the AND gate 38 ceases to provide a signal along its "no" branch to the pause command switch 40 and commences to provide a signal along its "yes" branch to the cancel command switch 42.

Figure 3:
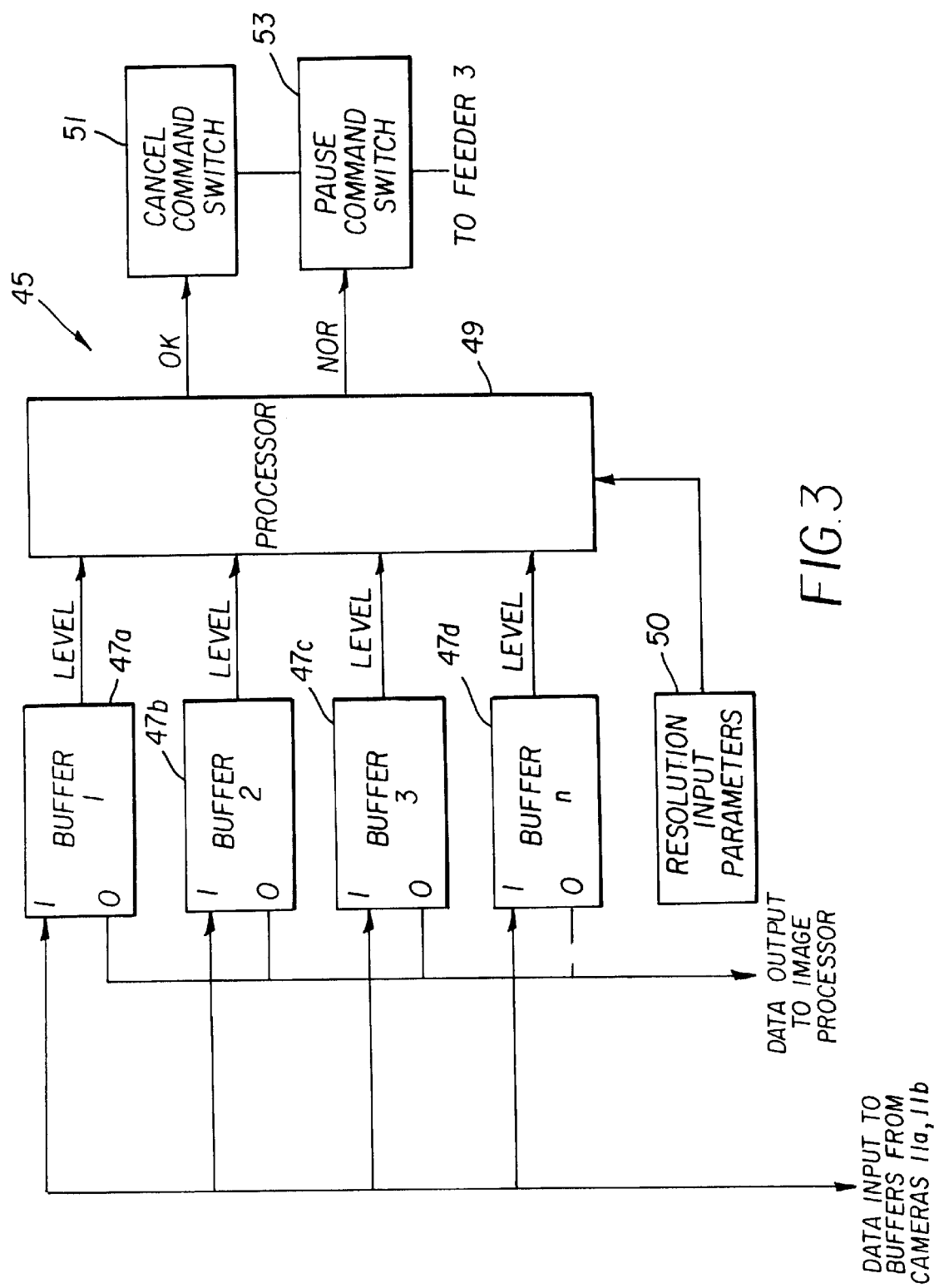
FIG. 3 is a schematic diagram of a second embodiment of the control system of the invention.

The embodiment of the system 45 illustrated in FIG. 3 works in substantially the same manner as described with respect to the embodiment 30 illustrated in FIG. 2, with the exception that the threshold levels corresponding to "almost full" and "sufficiently empty" are not pre-selected at the beginning of the operation of the document scanner 2, but rather are periodically modified by the processor 49 on the basis of a computed, floating value of a mode value of image data present on the documents during the scanning run. The processor 49 may also change the gap between the two capacity thresholds based upon the informational load on the processor 49 in a given document batch. Another difference in the operation between the two embodiments 30 and 45 is that the processor computes trends on the basis of the rate of optical data being processed from the documents, and will activate the pause command switch when the computed trends indicate that the floating "almost full" threshold in any of the buffers 47a–d is about to be exceeded. In the preferred embodiment, processor 49 may be a Model No. MPC 823 processor manufactured by Motorola.

One of the advantages of the invention is that it maximizes throughput not only for a particular processor bandwidth, but for a particular buffer memory capacity as well.

Although this invention has been described with respect to two preferred embodiments, numerous variations and additions will become evident to persons of skill in the systems art. Any such modifications, variations, and additions are intended to be encompassed within the scope of this patent application, which is limited only by the claims appended hereto.

PARTS LIST

1. Control system
2. Document scanner
3e. Document feeder
4. Input documents
5. Feeder conveyor
7. Scanning station
9. Platen
10. Light sources a–d
11. Cameras a, b
13. Lens a, b
15. Imaging sensor assembly
17. Directing lens
19. Mirror array
21. Internal document transporter
22. Documents in process
23. Output documents
25. Resolution selector switch
30. First embodiment of control system
32. Buffer memories a–d
34. Buffer monitor circuit
36. OR gate
38. AND gate
40. Pause feeder switch
42. Enable feeding switch
45. Second embodiment of control system 47. Buffer memories a–d
49. Processor
51. Enable feeding switch
53. Pause feeding switch

What is claimed is:

1. A control system for an optical scanner having a mechanism for feeding documents to a scanning station, comprising:

a plurality of buffer memories for temporarily storing optical data from documents fed through said scanning station, and a control circuit connected to said buffer memories and said document feeding mechanism for transmitting a command to change a delivery rate of said document feeding mechanism upon a determination that a threshold capacity of any of said buffer memories has been exceeded or is about to be exceeded.

2. The control system for an optical scanner according to claim 1, wherein said control circuit includes a buffer monitor circuit for determining whether any one of said plurality of buffer memories becomes filled to said threshold capacity.

3. The control system for an optical scanner according to claim 2, wherein the threshold capacity of each buffer circuit is preselected, and wherein said buffer monitor circuit generates a signal for each of said buffer memories indicative of whether any of said buffer memories is filled to said preselected threshold capacity.

4. The control system for an optical scanner according to claim 3, wherein said command to change said delivery rate is a pause command, and said control circuit further includes a gate circuit connected to said buffer monitor circuit signals for generating said pause command upon receipt of a signal that any one of said buffer memories is filled to said preselected threshold capacity.

5. The control system for an optical scanner according to claim 3, wherein said buffer monitor circuit also generates a second signal for each of said buffer memories indicative of whether each buffer circuit is filled to a second pre-selected threshold capacity that is smaller than said first threshold capacity.

6. The control system for an optical scanner according to claim 5, wherein said control circuit further includes first and second gate memories for receiving said first and second signals generated by said buffer monitor circuit.

7. The control system for an optical scanner according to claim 6, wherein said first gate circuit generates said pause command for said document feeding mechanism upon receipt of a signal that any of said buffer memories is filled to said first preselected threshold capacity, and said second gate circuit generates an enable command for said document feeding mechanism upon receipt of signals from each of said buffer memories that none of said buffer memories is filled to said second pre-selected threshold capacity.

8. The control system for an optical scanner according to claim 6, wherein said first and second gate memories are OR and AND gate memories, respectively.

9. The control system for an optical scanner according to claim 2, wherein said control circuit further includes a processor for individually and variably determining said threshold capacity for each buffer circuit on the basis of projected trends in a rate of image data, and whether any one of said determined threshold capacities is about to be exceeded.

10. The control system for an optical scanner according to claim 9, wherein said system includes a selector switch connected to said processor for generating a signal indicative of a resolution level of said scanning station, and wherein said processor changes a rate at which said document feeding mechanism delivers documents and further determines said threshold capacity for each buffer circuit in response at least in part to said signal.

11. The control system for an optical scanner according to claim 9, wherein said processor also individually determines a second threshold capacity for each buffer circuit that is lower than said first threshold capacity for all buffer memories.

12. The control system for an optical scanner according to claim 11, wherein said processor generates a pause command for said document delivery mechanism upon receipt of a signal that any of said buffer memories is filled to said first threshold capacity, and cancels said pause command upon receipt of a signal that the capacity of each buffer circuit is below said second threshold capacity.

13. A control method for an optical scanner having a mechanism for feeding documents to a scanning station, and a plurality of buffer memories for temporarily storing optical information from documents fed through said scanning station, comprising the steps of:

assigning a threshold capacity to each of said buffer memories;

assigning an initial operating speed to said document feeding mechanism;

operating said optical scanner while monitoring the amount of capacity available in each of said buffer memory memories, and changing a rate of the document feeding mechanism whenever the available capacity of any of said buffer memories exceeds or is about to exceed said selected threshold capacity.

14. The control method for an optical scanner according to claim 13, wherein said threshold capacity is less than the total capacity of each of said buffer memories such that each buffer circuit has a reserve memory capacity.

15. The control method for an optical scanner according to claim 14, wherein said threshold capacity is selected such that said reserve memory capacity is sufficient to store all optical data scanned on documents present within said scanning station at a time of changing the rate of said document feeding mechanism.

16. The control method for an optical scanner according to claim 13, further comprising the step of assigning a second threshold capacity to each of said buffer memories that is less than the first assigned threshold capacity for each buffer circuit.

17. The control method for an optical scanner according to claim 16, wherein said document delivery mechanism is paused when the first threshold capacity of any buffer circuit is exceeded, and further comprising the step of maintaining said pausing of the operation of said document delivery mechanism until the capacity of each buffer circuit falls below said second threshold capacity.

18. The control method for an optical scanner according to claim 13, wherein said initial operating rate of said document feeding mechanism is selected at least in part by estimating a mode value of optical data present on documents being scanned, and then by determining a maximum rate that said document feeding mechanism can operate with respect to said mode value without exceeding said threshold capacity of any of said buffer memories.

19. The control method for an optical scanner according to claim 18, wherein said initial operating rate is selected by determining a maximum rate that said document feeding mechanism can operate with respect to said mode value without exceeding a capacity of said buffer memories that is less than said threshold capacity of any of said buffer memories.

20. The control method for an optical scanner according to claim 13, further comprising the step of extrapolating a trend in the rate of optical data on said documents during said operating and monitoring step, and slowing the rate of the document delivery mechanism when said trend indicates that the selected threshold capacity of any of said buffer memories is about to be exceeded.

21. The control method for an optical scanner according to claim 13, further comprising the step of compressing said optical data before storing it in said buffer memories.

22. The control method for an optical scanner according to claim 16, wherein said first and second threshold capacities are pre-selected.

23. The control method for an optical scanner according to claim 13, further comprising the steps of selecting a resolution level of said scanning station, and determining said threshold levels in part on said selected resolution level.

* * * * *